ALEXANDER E. MARTENS
BERNARD J. SULLIVAN
INVENTORS

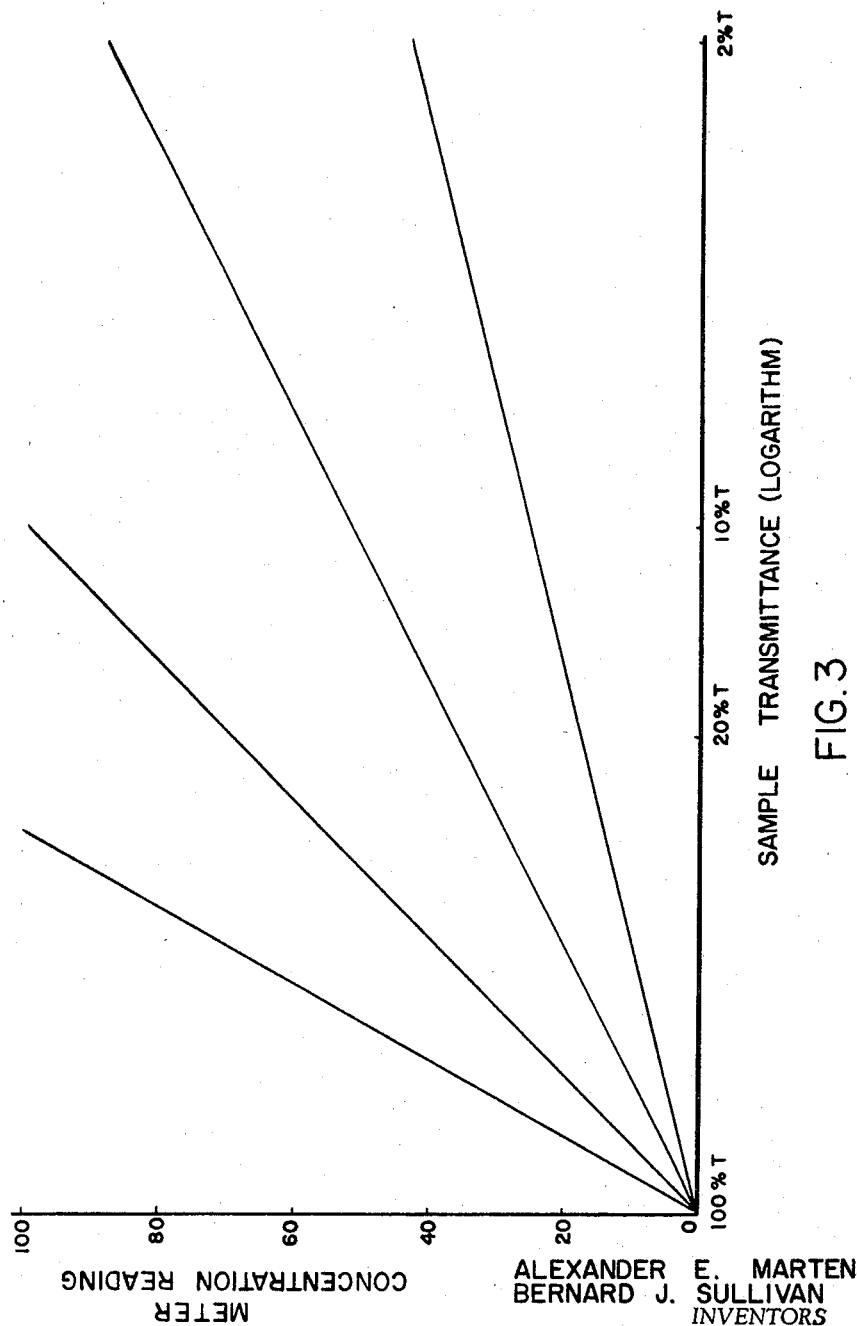

3,428,796
CONCENTRATION COMPUTER WITH LOGARITHMIC COMPUTATION OF PHOTOMETRIC APPARATUS READINGS
Alexander E. Martens, Greece, and Bernard J. Sullivan, Rochester, N.Y., assignors to Bausch & Lomb Incorporated, Rochester, N.Y., a corporation of New York
Filed Aug. 31, 1966, Ser. No. 576,381
U.S. Cl. 235—193                          9 Claims
Int. Cl. G06g 7/24

ABSTRACT OF THE DISCLOSURE

A semiconductor logarithmic conversion circuit is disclosed for connection to a photometer for converting electrical signals corresponding to transmission to readings in concentration.

---

This invention relates to measuring apparatus in general and more particularly to an electrical circuit adapted for use with spectrophotometers and other analytical instruments for automatically performing a logarithmic computation.

The use of photometric methods of analysis is becoming increasingly popular in various laboratories, such as clinical laboratories, since these methods provide a simple and rapid means of analyzing large numbers of samples. In the majority of the presently available photometric apparatus, such as spectrophotometers, radiation is applied to test samples and measurements are made to determine the percent of radiation transmitted through or absorbed by the sample. If determinations are made to analyze the concentration of particular absorbing substances in a sample, the transmission or absorption data must be converted mathematically to concentration data. This entails a tedious and time consuming logarithmic computation which includes possible sources of error due to poor operator judgment and mathematical computation. Photometric apparatus including a computer, or an accessory computer adapted to be employed with photometric apparatus, for automatically converting the transmission data into concentration data would greatly simplify the procedure for such analysis as well as increasing the accuracy of the test results.

It is therefore an object of this invention to provide a new and improved computing apparatus adapted to be used with a photometric apparatus for automatically providing a logarithmic computation of the readings made by the photometric apparatus.

It is also an object of this invention to provide a new and improved apparatus adapted to be used in conjunction with spectrophotometers and the like for providing a direct reading corresponding to the concentration of a particular absorbing substance in a test sample being observed.

It is still a further object of this invention to provide a new and improved photometric measuring apparatus for automatically measuring both the transmission characteristics and the concentration of an absorbing substance in a test sample being observed.

Apparatus of the invention includes an electrical circuit adapted to be connected to photometric apparatus, such as spectrophotometers and the like that provide a signal corresponding to radiation transmitted through a sample in a test chamber, and perform a logarithmic computation to provide a reading corresponding to the concentration of an absorbing substance. The electrical circuit includes a logarithmic converting circuit that is adapted to develop a direct current output signal that is a logarithmic function of a direct current signal applied thereto. The logarithmic converting circuit includes a variable impedance element to control the particular logarithmic computation performed in accordance to the particular absorbing substance being measured. Circuit means couple the logarithmic converter circuit between an input circuit (adapted to be connected to the photometric apparatus to receive the signal corresponding to sample radiation transmission) and an indicator means to provide a reading of sample concentration. A second impedance element is included in the circuit means so that in response to a blank solution positioned in the sample chamber the second impedance element is preset to provide a zero reading in the indicator means. In response to a standard solution positioned in the sample chamber the first variable impedance is preset to provide a predetermined reading in the indicator means thereby precalibrating the electrical circuit to provide an automatic indication of the concentration of an absorbing substance of an unknown test sample when positioned in the sample chamber.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIGURE 3 is a plot of concentration versus percent transmittance as read by the indicator as the function of the settings of the calibrate control of FIGURE 2.

According to Beer's law, the amount of monochromatic light (a limited band of radiation wavelength) absorbed by a solution is directly proportional to the concentration of a radiation absorbing substance therein. The relationship between absorbance and concentration is expressed in Equation 1.

$$C = K_1 A \quad \text{(Equation 1)}$$

where
$A$ = absorbance
$K_1$ = a constant (characterized by the particular solution being analyzed)
$C$ = concentration Absorbance is defined as the logarithm of the reciprocal of the transmittance. This is expressed as:

$$A = \log_{10} 1/T \quad \text{(Equation 2)}$$

where
$A$ = absorbance
$T$ = transmittance

Combining Equation 1 with Equation 2 we have:

$$C = K_1 \log_{10} 1/T \quad \text{(Equation 3)}$$

The usual spectrophotometer output is a voltage proportional to transmittance.

$$V_1 = K_2 T \quad \text{(Equation 4)}$$
$$V_1/K_2 = T \quad \text{(Equation 5)}$$

where
$V_1$ = voltage output of the spectrophotometer
$K_2$ = a constant

Substituting T as expressed in Equation 5 into Equation 3 we have:

$$C = K_1 \log_{10} K_2/V_1 \quad \text{(Equation 6)}$$

or $$C = K_1 (\log_{10} K_2 - \log_{10} V_1) \quad \text{(Equation 7)}$$

The function of the Concentration Computer is to solve this equation in a manner fully explained in a later portion of the specification. The concentration computer effectively converts the voltage output of the spectrophotometer into a voltage proportional to the concentration of the solution in accordance to the following equation:

$$V_2 = K_1 (\log_{10} K_2 - \log_{10} V_1) \quad \text{(Equation 8)}$$

$V_2$ = voltage output of the Concentration Computer adapted to be applied to an indicator means.

Figure 1:
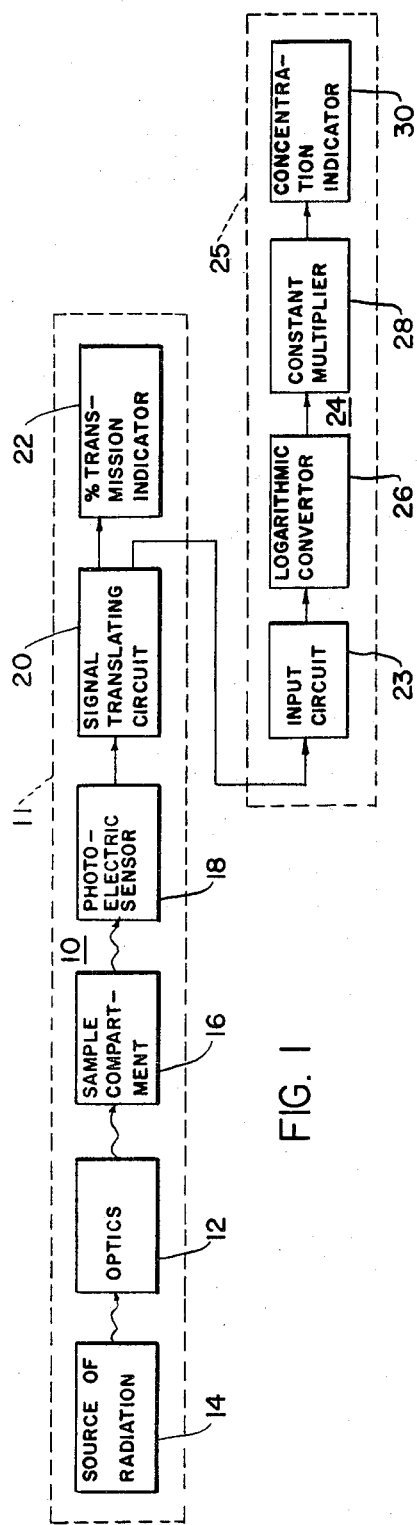
FIGURE 1 is a block diagram of a combination photometer and concentration computer embodying the invention.

Referring now to the block diagram of FIGURE 1, a photometer 10, such as a conventional spectrophotometer, is illustrated within the dashed block 11. The photometer 10 includes optical means 12 for focusing a beam of radiation from a source 14 onto a sample compartment 16 adapted to receive test samples to be analyzed. The radiation transmitted through the sample compartment 16 is received by a photosensor 18 which generates and applies an electrical signal corresponding to the amount of radiation received, to a conventional spectrophotometer signal translating circuit 20 to develop a voltage $V_1$ proportional to the sample transmittance in accordance to Equation 4. The voltage developed by the signal translating circuit 20 is coupled to a suitable indicator 22 that provides a reading in percent (%) of radiation transmitted. Such photometers and spectrophotometers are well known in the art and do not need any further explanation such as for example that disclosed in U.S. Patent No. 3,234,408, entitled "Pulse Producing Capacitor Circuits Including One or More Commutating Switches," issued to H. G. Camnitz.

A block diagram of a concentration computer 24 embodying the invention for solving the Equation 7 is illustrated within a dashed block 25. The signal $V_1$ from the signal translating circuit 20 is applied through an input circuit 23 to a logarithmic converter 26. The logarithmic converter 26 is coupled to a constant multiplier 28 to provide the required constants for developing the signal $V_2$ of the Equation 8. The output of the constant multiplier 28 is applied to a concentration indicator 30 thereby providing an automatic reading of the concentration of the absorbing substance in a test sample according to Equation 7.

Figure 2:
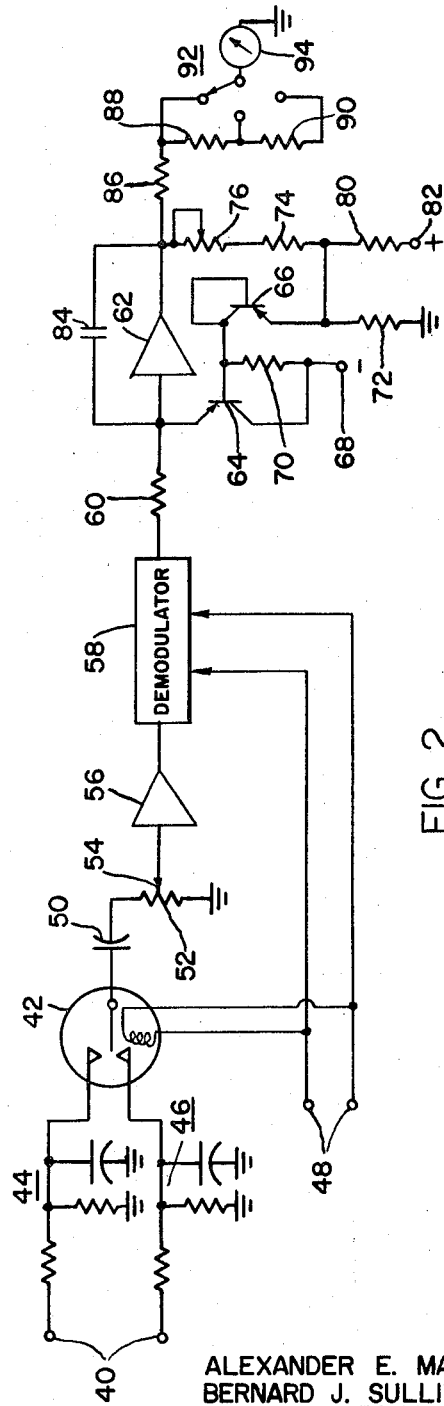
FIGURE 2 is a schematic diagram of a portion of the block diagram of FIGURE 1 including the concentration computer.

Referring now to FIGURE 2, the input circuit 23 of the concentration computer 24 includes a pair of terminals 40 adapted to be suitably connected to a portion of the signal translating circuit 20 to pick off the voltage $V_1$ corresponding to the Equation 4. If the signal is double ended or balanced, it is applied across both the terminals 40. On the other hand, if the signal is single ended, the signal is applied to one of the terminals 40 while the other is grounded. The terminals 40 are connected to the stationary contacts of a chopper 42 through a pair of filter circuits 44 and 46 employed to minimize stray signal pick up. The coil of the chopper 42 is connected to a pair of terminals 48 adapted to be connected to an alternating current source, such as the 60 cycle line mains. Although the chopper 42 is illustrated as a mechanical chopper, it is to be understood that this type of chopper is merely illustrative and other types of choppers such as solid state, etc. can be employed.

The movable contact of the chopper 42 is coupled through a capacitor 50, through a zero adjust potentiometer 52 to ground. The movable arm 54 of the potentiometer 52 is coupled to an alternating current (A–C) amplifier 56 which in turn applies the amplified signals to a conventional demodulator 58. The reference voltage for the demodulator is provided by connection to the terminals 48. The combination of the chopper 42, the potentiometer 52, the amplifier 56 and the demodulator 58 functions as a variable gain, low drift, direct current amplifier.

The output from the demodulator 58 is coupled through a resistor 60 to a circuit combining the logarithmic converter 26 and the constant multiplier 28 of FIGURE 1. The circuit includes a direct current amplifier 62 having an exponential negative feedback connected between its input and output circuits to provide the logarithmic computation. The feedback circuit includes a pair of transistors 64 and 66 with base to emitter junction of the transistor 64 providing the exponential characteristic and the transistor 66 providing temperature compensation.

The collector and emitter electrodes of the transistor 64 are connected between a terminal 68 (adapted to be connected to a negative source of energizing potential) and the input circuit of the amplifier 62. A biasing voltage for the transistor 64 is provided by a resistor 70 connected between the terminal 68 and the base electrode of the transistor 64. Both the collector and base electrodes of the transistor 66 are directly connected to the base electrode of the transistor 64 shorting out the collector to base junction of the transistor. The emitter electrode of the transistor 66 is connected to ground through a resistor 72 and to the output circuit of the amplifier 62 through the series circuit including the resistor 74 and the calibrate potentiometer 76 to complete the feedback circuit. Biasing for the transistor 66 is provided by a resistor 80 connected between a terminal 82 (adapted to be connected to a positive energizing source of potential) and the emitter electrode of the transistor 66. A capacitor 84 is connected between the input and output terminals of the amplifier 62 to provide a suitable stability factor for the circuit.

The output circuit of the amplifier 62 is coupled to a meter range circuit including resistors 86, 88, and 90 connected in series. The junction of the resistors 86 and 88, 88 and 90 and the other end of the resistor 90 are connected to the stationary contacts of a range switch 92. The movable arm of the range switch 92 is connected to ground through the concentration indicator, such as a meter 94, that provides a reading corresponding to the concentration of the absorbing substance in the sample under test. Although, the concentration indicator 30 is illustrated as a meter 94, it is to be understood that other indicators such as recorders, print-out devices, etc. can also be employed.

The concentration of a particular absorbing substance in a test solution is generally computed by applying radiation of a given wave-length to which the substance in question is particularly absorbent. A blank solution corresponding to a sample having a zero concentration (100% transmission) is first positioned into the sample compartment 16 and the zero potentiometer 52 is adjusted for a zero concentration reading on the meter 94. Next, a sample containing a known concentration of absorbing substance of the type to be detected is placed in the sample compartment 16, the range switch 92 is positioned to the desired sensitivity, and the calibrate potentiometer 76 is adjusted to provide a pre-determined reading on the meter 94 corresponding to the concentration of the absorbing substance in the reference sample. Accordingly, the concentration computer is now calibrated for a particular absorbing substance at two points, a zero point and a known concentration point.

The effect of the adjustment of the zero potentiometer 52 and the calibrate potentiometer 76 is illustrated in FIGURE 3, wherein the concentration, as read by the meter 94, is plotted against percent of sample transmittance as the function of four positions of the calibrate potentiometer 76. By setting the calibrate potentiometer 76 with the reference sample in the sample compartment the constant $K_1$ (characteristic of the particular absorbing substance being analyzed) and $K_2$ are preset to solve the Equation 7.

If the solution to be tested contains a small amount of the absorbing substance, the movable arm of the switch 92 is positioned at the stationary contact connected to the junction of the resistors 86 and 88 thereby providing a maximum sensitivity for the meter 94. As higher concentrations are to be detected, the movable arm of the switch 92 can be connected to the stationary contacts connected to either end of the resistor 90 and the reading observed in the meter 94 is multiplied by constant determined by the relative size of the resistors connected in series with the meter 94.

The concentration computer of the invention provides an automatic means of accurately computing the concentrations of absorbing substances in unknown solutions. The operator merely simultaneously pre-calibrates the concentration computer to the attached photometer and constants of the absorbing substances to be detected in a manner as previously described, and then sequentially positions a series of test samples containing unknown concentrations of the particular absorbing substance into the sample compartment. Each time a new test sample is inserted in the sample compartment 16 a concentration reading is automatically indicated by the meter 94 thereby eliminating the need for the tedious and time consuming computation previously required. The concentration computer may for example comprise an accessory that can be simply connected by means of a quick disconnect plug to a variety of photometric instruments requiring essentially only the simple pre-calibration procedure as previously set forth. In addition, it should be noted that the photometer or spectrophotometer including the concentration computer may still function to accurately provide information of sample transmission data as well as being capable of automatically providing concentration data thereby increasing the versatility of the apparatus.

What is claimed is:

1. An electrical circuit for connection to a photometer that provides an electrical signal having an amplitude corresponding to the amount of radiation transmitted through a test chamber for receiving a sample having a radiation absorbing substance therein, the concentration of which is a logarithmic function of said electrical signal, said electrical circuit comprising:

an input circuit for connection to said photometer for receiving said electrical signal;

an amplifier circuit coupled to said input circuit for amplifying said photometer electrical signal;

first circuit means coupled to said amplifier circuit for developing a direct current signal having a magnitude that is proportional to the amplitude of the amplified electrical signal;

a semiconductor logarithmic circuit coupled to said first circuit means for developing a direct current signal having a magnitude that is a logarithmic function of the magnitude of the direct current signal received from said first circuit means;

indicator means;

second circuit means coupling said indicator means to said semiconductor logarithmic circuit to apply said logarithmic direct current signal to said indicator, said indicator means provides a reading corresponding to the concentration of said absorbing substance in said sample;

gain control circuit means in said amplifier circuit for presetting said indicator means to a zero concentration reading when said sample does not include any measurable amount of said radiation absorbing substance, and adjustable circuit means in said logarithmic circuit for controlling said logarithmic function to provide a preset reading on said indicator means when said sample includes a known concentration of said radiation absorbing substance thereby cooperating with said gain control circuit means for calibrating said indicator means for reading in concentration.

2. An electrical circuit as defined in claim 1 wherein:
said logarithmic circuit includes an amplifier having an exponential feedback circuit;
said adjustable circuit means includes a potentiometer connected in said exponential feedback circuit, and
said second circuit means includes a variable impedance means providing a range adjustment for said indicator means.

3. An electrical circuit as defined in claim 1 wherein said logarithmic circuit comprises:
a direct current amplifier including an input and an output circuit;
a circuit means coupling said direct current amplifier input circuit to said first circuit means to receive said direct current signal;
exponential feedback circuit means coupled between said amplifier input and said output circuits so that a direct current output signal is developed at said output circuit that is a logarithmic function of said direct current input signal, and
said adjustable circuit means comprises a potentiometer in said exponential feedback circuit means for controlling the amount of signal feedback for said direct current amplifier and determine the logarithmic function.

4. An electrical circuit as defined in claim 3 wherein said exponential feedback means includes the base to emitter current path of a transistor.

4. An electrical circuit as defined in claim 3 wherein said first circuit means comprises:

5. An electrical circuit as defined in claim 3 wherein
a chopper circuit coupled to said input circuit;
an alternating current amplifier coupled through said variable impedance means to said chopper circuit so that said variable impedance means controls the gain of said first circuit means, and
a demodulator circuit coupled to said alternating current amplifier for providing said direct current signal, the magnitude of which is directly related to the signal applied to said input circuit.

6. An electrical circuit for connecting to a spectrophotometer including a sample chamber for receiving test samples having radiation absorbing particles therein that provide a direct current signal having a magnitude corresponding to the amount of radiation transmitted through a test sample in said chamber, said electrical circuit comprises:

input circuit means for connection to said spectrophotometer for receiving said direct current signal;

a semiconductor logarithmic converter circuit for developing a direct current output signal that is a logarithmic function of a direct current signal received by said converter circuit;

indicator means;

circuit means coupling said converter signal to said indicator means for applying said logarithmic output signal thereto;

circuit means, including a first variable impedance element, coupling said converter circuit to said input circuit providing a zero concentration calibration adjustment for said indicator means when a blank solution is in said sample chamber, and circuit means connected in said converter circuit including a second variable impedance element providing a calibration adjustment for said indicator to present said indicator to a predetermined reading when a standard solution having a known concentration of an absorbing substance is in said sample chamber thereby precalibrating said indicator means to provide a reading of the concentration of the substance of an unknown solution in said sample chamber.

7. An electrical circuit as defined in claim 6 wherein said logarithmic converter circuit comprises:
a direct current amplifier circuit including an input circuit and an output circuit;
a negative exponential feedback circuit connected between said input and output circuits of said direct current amplifier including said second variable impedance element and the base-to-emitter junction of at least one transistor connected in a series circuit so that a direct current signal is developed at said output circuit that is a logarithmic function of a direct current signal applied to the input circuit and so that the slope of the plot of the magnitude of said output signal versus the logarithm of said spectrophotometer direct current signal in a function of the setting of said second variable impedance element.

8. The combination comprising:

a source of radiation;

a sample compartment adapted to receive samples to be tested;

radiation sensitive means for generating an electrical signal in response to radiation applied thereto;

optical means for directing a beam of radiation through a sample in said sample compartment to said radiation sensitive means for developing an electrical signal having an amplitude that is a direct function of the amount of radiation transmitted through said sample;

a semiconductor logarithmic converter circuit for developing a direct current output signal that is a logarithmic function of a direct current signal received by said converter circuit;

indicator means;

circuit means, including a first variable impedance element, coupling said converter circuit to said radiation sensitive means providing a zero concentration calibration adjustment for said indicator means when a blank solution is in said sample chamber, and circuit means connected in said converter circuit including a second variable impedance element providing a calibration adjustment for said indicator to preset said indicator to a predetermined reading when a standard solution having a known concentration of an absorbing substance is in said sample chamber thereby precalibrating said indicator means to provide a reading of the concentration of the substance of an unknown solution of said sample chamber.

9. The combination as defined in claim 8 wherein:

said circuit means comprises a signal translating circuit coupled between said radiation sensitive means and said logarithmic converter circuit for developing a direct current signal that is proportional to the amount of radiation transmitted through a sample in said sample compartment, and second indicator means coupled to said signal translating circuit for providing a reading corresponding to the percent of radiation transmitted through a sample in said sample compartment.

References Cited

UNITED STATES PATENTS

| | | |
|---|---|---|
| 3,245,304 | 4/1966 | Davis. |
| 3,297,860 | 1/1967 | Weiss _____ 235—151.35 |

MALCOLM A. MORRISON, *Primary Examiner.*

J. F. RUGGIERO, *Assistant Examiner.*

U.S. Cl. X.R.

235—151.35

UNITED STATES PATENT OFFICE
CERTIFICATE OF CORRECTION

Patent No. 3,428,796　　　　　　　　　　　　　　　　　　　February 18, 1969

Alexander E. Martens et al.

It is certified that error appears in the above identified patent and that said Letters Patent are hereby corrected as shown below:

Column 6, lines 21 and 22, cancel "4. An electrical circuit as defined in claim 3 wherein said first circuit means comprises:"; between lines 23 and 24 insert -- said first circuit means comprises: --; line 58, "present" should read -- preset --.

Signed and sealed this 14th day of April 1970.

(SEAL)
Attest:

Edward M. Fletcher, Jr.　　　　　　　　　　　　　　WILLIAM E. SCHUYLER, JR.
Attesting Officer　　　　　　　　　　　　　　　　　　　　Commissioner of Patents